(12) United States Patent
Wein et al.

(10) Patent No.: US 8,402,612 B2
(45) Date of Patent: Mar. 26, 2013

(54) DUAL MAGNETIC INTERLOCKING PIN SYSTEM

(75) Inventors: Michael Wein, Houston, TX (US); Stephen Douglas Alexander, Houston, TX (US)

(73) Assignee: The Dual Magnetic Interlocking Pin System, LLC, Houston, TX (US)

( * ) Notice: Subject to any disclaimer, the term of this patent is extended or adjusted under 35 U.S.C. 154(b) by 710 days.

(21) Appl. No.: 12/247,962

(22) Filed: Oct. 8, 2008

(65) Prior Publication Data

US 2010/0011544 A1    Jan. 21, 2010

Related U.S. Application Data

(63) Continuation-in-part of application No. 12/041,994, filed on Mar. 4, 2008, now abandoned, which is a continuation-in-part of application No. 11/695,837, filed on Apr. 3, 2007, now abandoned.

(51) Int. Cl.
*A44B 99/00* (2010.01)
*A45F 5/00* (2006.01)

(52) U.S. Cl. .......................................... 24/303

(58) Field of Classification Search ............. 24/303, 24/66.1; 63/900; 292/251.5
See application file for complete search history.

(56) References Cited

U.S. PATENT DOCUMENTS

| | | | |
|---|---|---|---|
| 2,070,121 A | 2/1937 | Gibson | |
| 2,260,055 A * | 10/1941 | Reardon | 81/451 |
| 2,557,825 A | 6/1951 | Hotze | |
| 2,975,497 A * | 3/1961 | Budreck | 24/303 |
| 3,041,697 A * | 7/1962 | Budreck | 24/303 |
| 3,079,535 A * | 2/1963 | Schultz | 335/295 |
| 3,141,214 A * | 7/1964 | Bey | 24/303 |
| 3,192,894 A | 7/1965 | Staver | |
| 3,204,601 A | 9/1965 | Staver | |
| 3,815,066 A | 6/1974 | Vinal | |
| 3,906,763 A | 9/1975 | Bochory | |
| 4,081,114 A | 3/1978 | Inoue | |
| 4,230,224 A | 10/1980 | Weeks | |
| 4,265,002 A * | 5/1981 | Hosken | 24/303 |
| 4,901,405 A * | 2/1990 | Grover et al. | 24/303 |
| 5,047,061 A | 9/1991 | Brown | |
| 5,209,090 A * | 5/1993 | Stillwagon | 70/456 R |
| 5,457,976 A * | 10/1995 | Stillwagon | 70/456 R |
| 5,541,790 A * | 7/1996 | Bleeke | 360/256.2 |
| 5,740,557 A | 4/1998 | Reid et al. | |
| 5,794,767 A | 8/1998 | Wilson | |
| 5,967,767 A | 10/1999 | Khon | |
| 5,975,661 A | 11/1999 | Jeziorowski et al. | |
| 6,182,336 B1 * | 2/2001 | Bauer | 24/303 |
| 6,306,332 B1 | 10/2001 | Angellotti | |
| 6,477,749 B1 * | 11/2002 | Reiter | 24/303 |
| 6,848,288 B1 | 2/2005 | Derman | |
| 7,073,232 B1 * | 7/2006 | Fuhrman et al. | 24/303 |
| 7,334,433 B1 * | 2/2008 | Fuhrman et al. | 63/3.1 |
| 2001/0030481 A1 | 10/2001 | Itami et al. | |
| 2002/0112323 A1 | 8/2002 | Nire | |
| 2005/0081235 A1 | 4/2005 | Raguin | |
| 2005/0139558 A1 | 6/2005 | Kephart | |
| 2006/0110188 A1 | 5/2006 | Martin | |
| 2006/0174455 A1 * | 8/2006 | Saitoh et al. | 24/303 |
| 2007/0064196 A1 | 3/2007 | Avery | |
| 2007/0251062 A1 * | 11/2007 | Saitoh et al. | 24/303 |
| 2008/0005873 A1 * | 1/2008 | Barton et al. | 24/303 |
| 2008/0060175 A1 | 3/2008 | Barvosa-Carter et al. | |
| 2008/0141502 A1 * | 6/2008 | Khubani | 24/303 |
| 2008/0248434 A1 | 10/2008 | Wein | |
| 2008/0284586 A1 | 11/2008 | Chang | |
| 2008/0295283 A1 * | 12/2008 | Tice | 16/84 |
| 2009/0047098 A1 * | 2/2009 | Darling | 411/457 |

\* cited by examiner

*Primary Examiner* — Robert J Sandy
*Assistant Examiner* — Louis Mercado
(74) *Attorney, Agent, or Firm* — Buskop Law Group, PC; Wendy Buskop

(57) ABSTRACT

A dual magnetic interlocking pin system for attaching an item with a free moving magnet for providing a magnetic attraction strong enough to movably hold the free moving magnet adjacent a first outer plate.

14 Claims, 6 Drawing Sheets

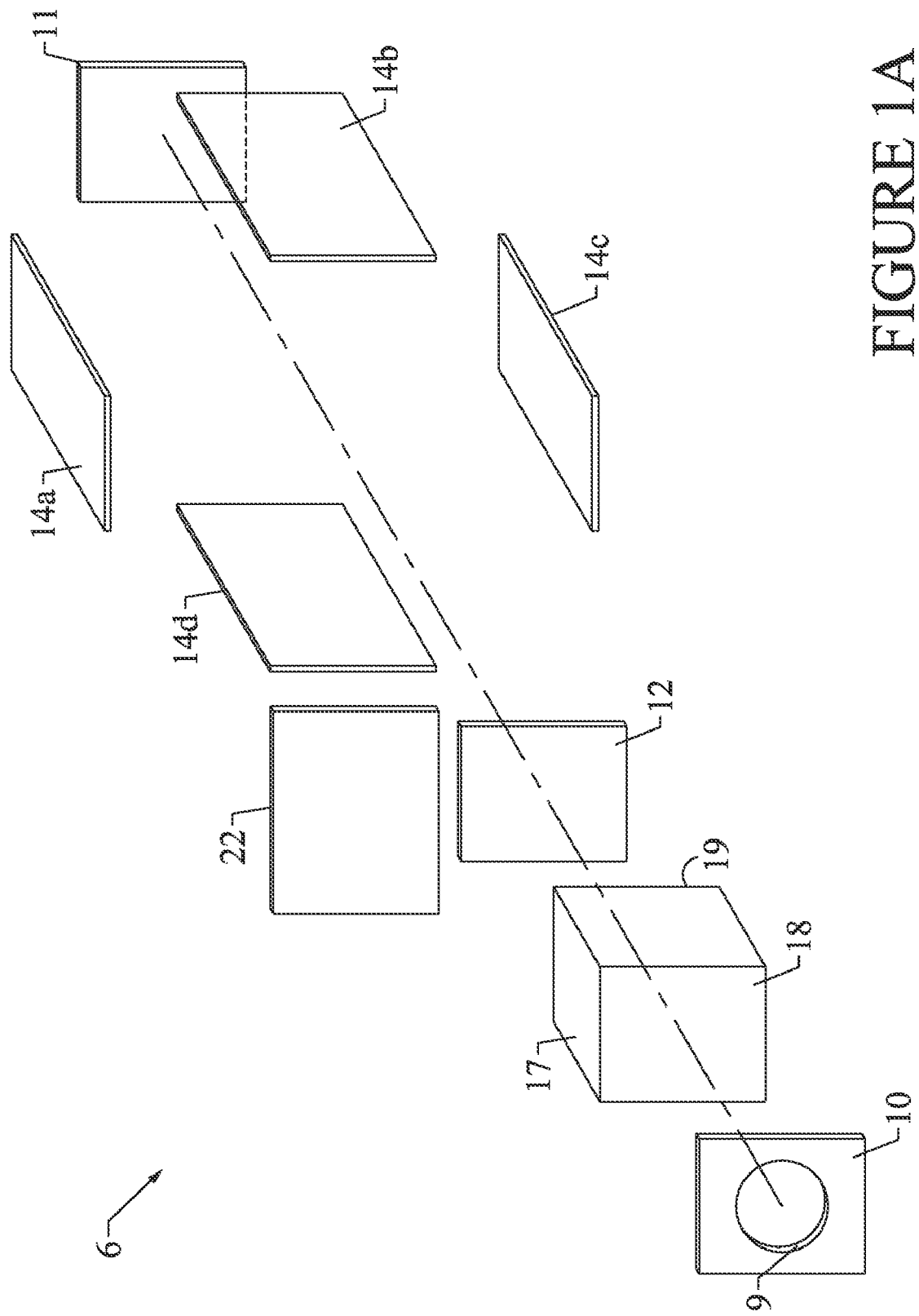

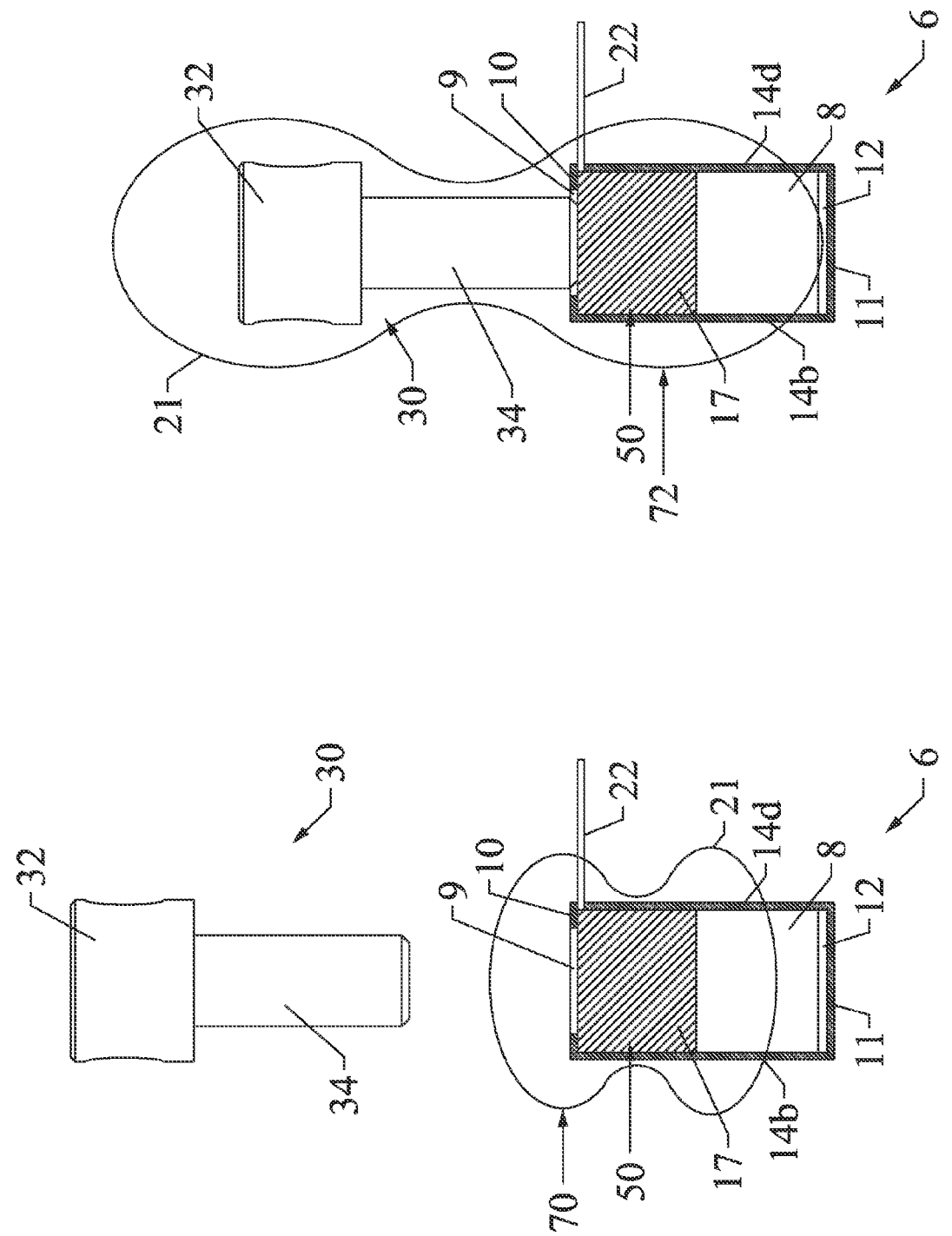

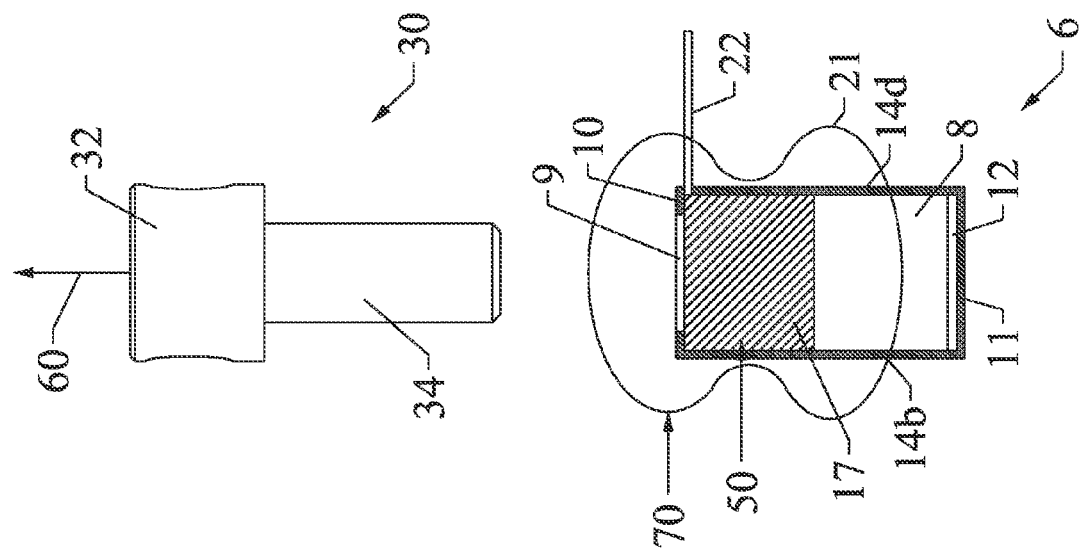
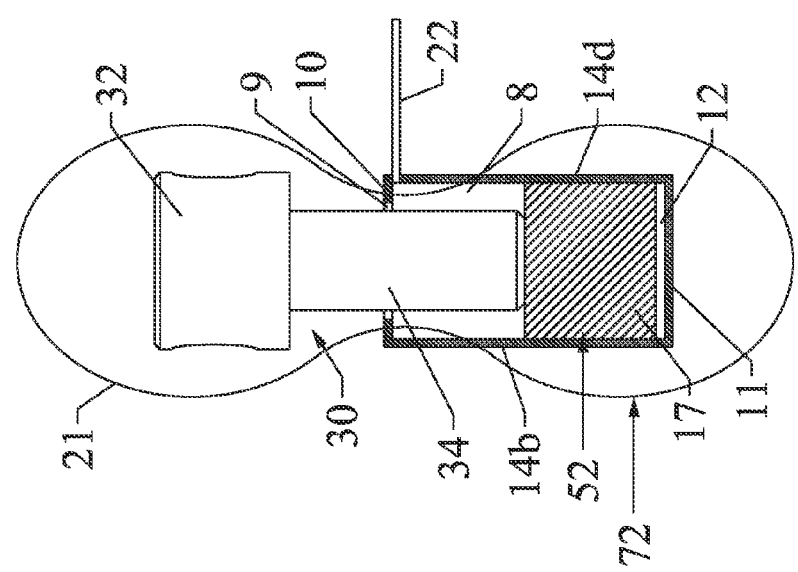
FIGURE 3C
FIGURE 3D

DUAL MAGNETIC INTERLOCKING PIN SYSTEM

CROSS REFERENCE TO RELATED APPLICATIONS

The current application is a Continuation in Part of co-pending U.S. patent application Ser. No. 12/041,994 filed on Mar. 4, 2008, Entitled "Magnetic Lighter", which is a Continuation in Part of abandoned U.S. patent application Ser. No. 11/695,837 filed Apr. 3, 2007, Entitled "Magnetic Keychain Lighter". Theses references are incorporated herein.

FIELD

The present embodiments relate to a dual magnetic interlocking pin system for attaching an item with a free moving magnet for providing a magnetic attraction strong enough to movably hold the free moving magnet adjacent a first outer plate.

BACKGROUND

Items that are small and compact in size are usually lost or misplaced. Once lost or misplaced, these items are not easily found and are usually replaced to avoid the consumer's time spent on trying to relocate these items.

A need exists for an assembly with a dual magnetic interlocking pin system to provide an easy and efficient way for items.

A further need exists for a dual magnetic interlocking pin system, which is easy to connect and disconnect, which is easy to use, to avoid having to spend time looking for lost or misplaced items and is cost efficient in not having to replace these items.

The present embodiments meet these needs.

BRIEF DESCRIPTION OF THE DRAWINGS

The detailed description will be better understood in conjunction with the accompanying drawings as follows:

FIGS. 1A is an isometric view of the dual magnetic interlocking pin system that is completely disassembled.

FIGS. 3A-3D are cut views of the dual magnetic interlocking pin system engaging an engagement pin.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a dual magnetic interlocking pin system for attaching an item with a free moving magnet for providing a magnetic attraction strong enough to movably hold the free moving magnet adjacent a first outer plate.

Referring now to the Figures, FIG. 1A shows an isometric view of the dual magnetic interlocking pin system that is completely disassembled.

Figure 1B:
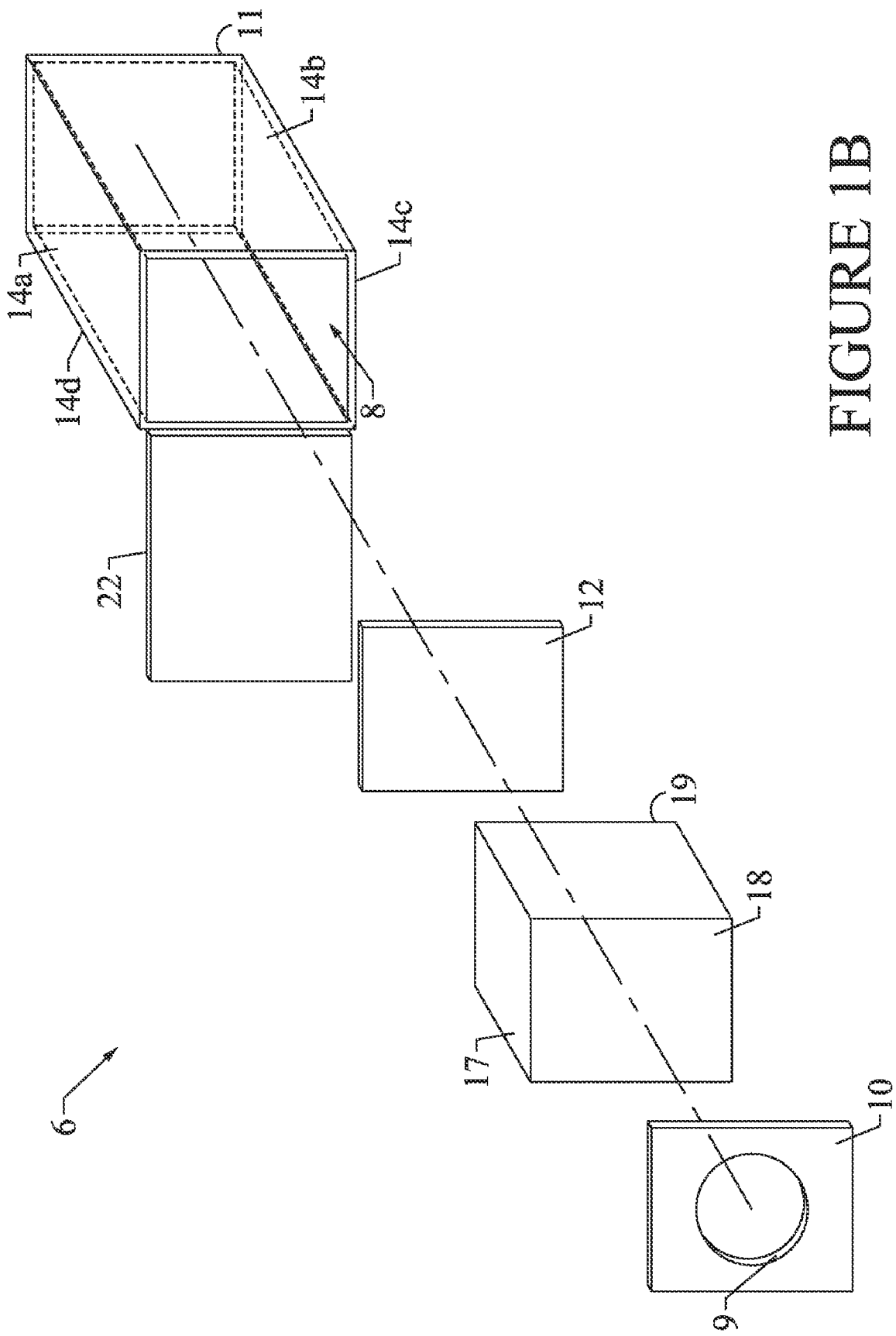
FIG. 1B is an isometric view of the dual magnetic interlocking pin system that is partially assembled.

A dual magnetic interlocking pin system (6) for carrying an item has a chamber (8), which can best be seen in FIG. 1B, having an opening (9) in a top wall (10).

The dual magnetic interlocking pin system (6) also has at least a bottom wall (11), opposite the top wall (10), and four side walls (14a-14d). In an embodiment it can be contemplated that there can be more than four side walls. In another embodiment it can be contemplated that there can be less than four side walls. In another embodiment, the side wall can be continuous and cylindrical in shape. It is also contemplated, that the sidewalls and the bottom wall can also be formed by a manufactured depression in an item.

The dual magnetic interlocking pin system (6) can have a magnetically attractable inner plate (12) fixed within the chamber (8) adjacent the bottom wall (11). The dual magnetic interlocking pin system (6) can also have a magnetically attractable outer plate (22).

The magnetically attractable outer plate (22) can be secured to an end of the side wall (14d) opposite the magnetically attractable inner plate (12). The magnetically attractable outer plate (22) can have a thickness and magnetic attraction strong enough to hold a free moving magnet (17) adjacent the magnetically attractable outer plate (22). It can be contemplated that more than one magnetically attractable outer plate can be used in the dual magnetic interlocking pin system (6). It is also contemplated that the magnetically attractable outer plate (22) can be secured to any of the side walls.

In an embodiment, a side wall can have at least a right side wall with a right side wall top and a left side wall with a left side wall top.

The free moving magnet (17) can have a first magnet flat side (18) and a second magnet flat side (19) opposite the first magnet flat side, wherein the free moving magnet can be slidably disposed in the chamber (8) for moving between top wall (10) and the magnetically attractable inner plate (12).

In an embodiment, the free moving magnet can be a cylindrical-shaped magnet, a cube-shaped magnet, or another geometrical shaped magnet. The geometrical shape can depend on the manufacturing of an item.

In another embodiment, the free moving magnet can be a solid magnet and all sides of the magnet can be magnetic. The free moving magnet can further be a rare earth metal magnet.

In this embodiment, rare earth metals can be such as neodymium iron boron magnet graded in strength from N24 to N54, which is a permanent magnet and further can include the following four classes: Neodymium Iron Boron (NdFeB or NIB), Samarium Cobalt (SmCo), Alnico, Ceramic or Ferrite.

Additional magnets can be used, as there are 3 main types of magnets: Permanent Magnets, Temporary Magnets, and Electromagnets.

FIG. 1B shows an isometric view of the dual magnetic interlocking pin system that is shown partially assembled. The side walls (14a-14d) and the bottom wall (11) are shown connected with one another to form the chamber (8). The magnetically attractable outer plate (22) can be secured to an end of the side wall (14d) opposite the magnetically attractable inner plate (12).

In an embodiment the chamber can be round or polygon in shape.

Figure 1C:
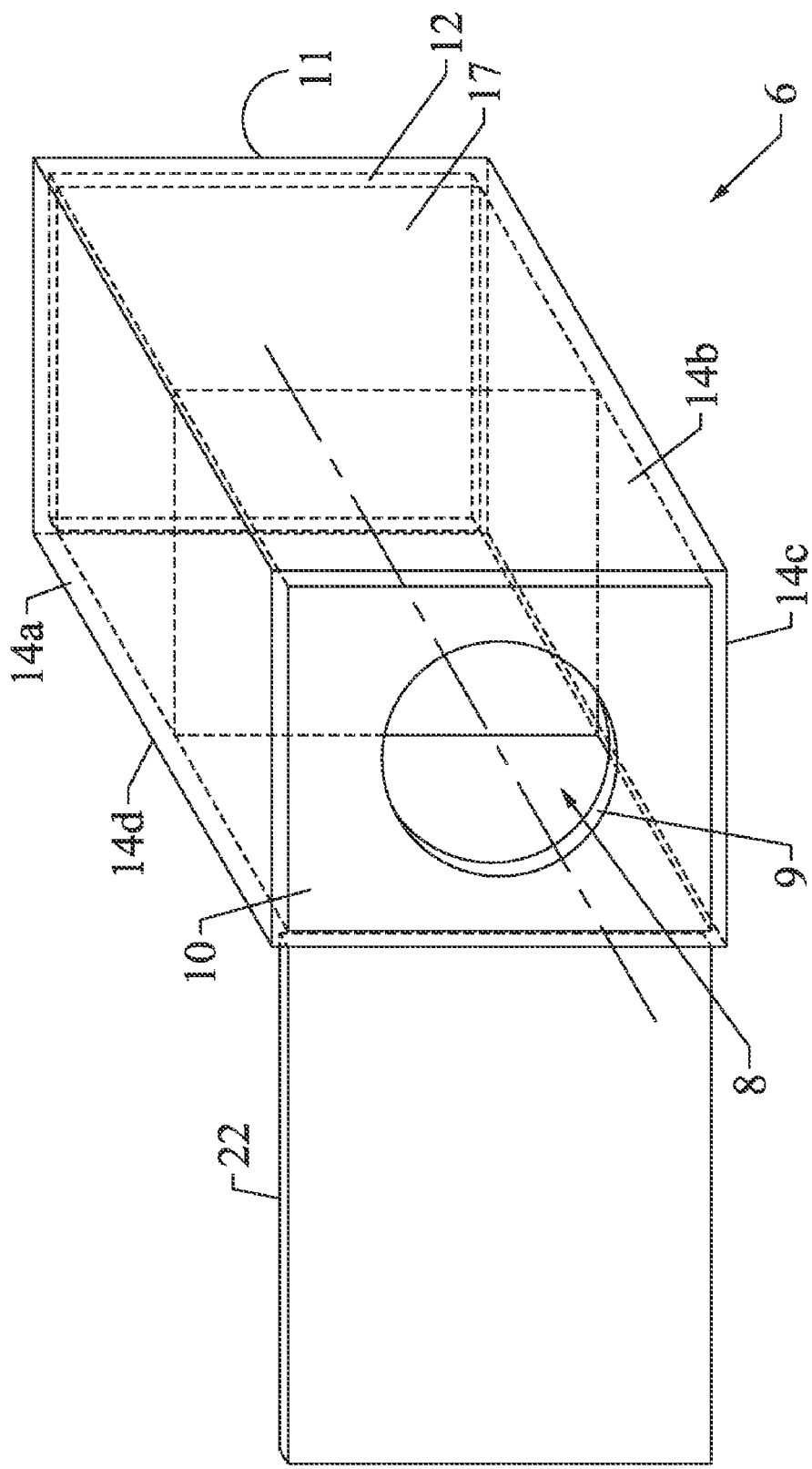
FIG. 1C is an isometric view of the dual magnetic interlocking pin system that is fully assembled.

FIG. 1C shows an isometric view of the dual magnetic interlocking pin system that is fully assembled. The magnetically attractable inner plate (12) can be attached to the bottom wall (11) inside the chamber (8). The free moving magnet (17) can be slidably disposed in the chamber (8) for moving between top wall (10) and the magnetically attractable inner plate (12). The top wall (10), having an opening (9), can be attached to the side walls (14a-14d) opposite the bottom wall (11).

Figure 2:
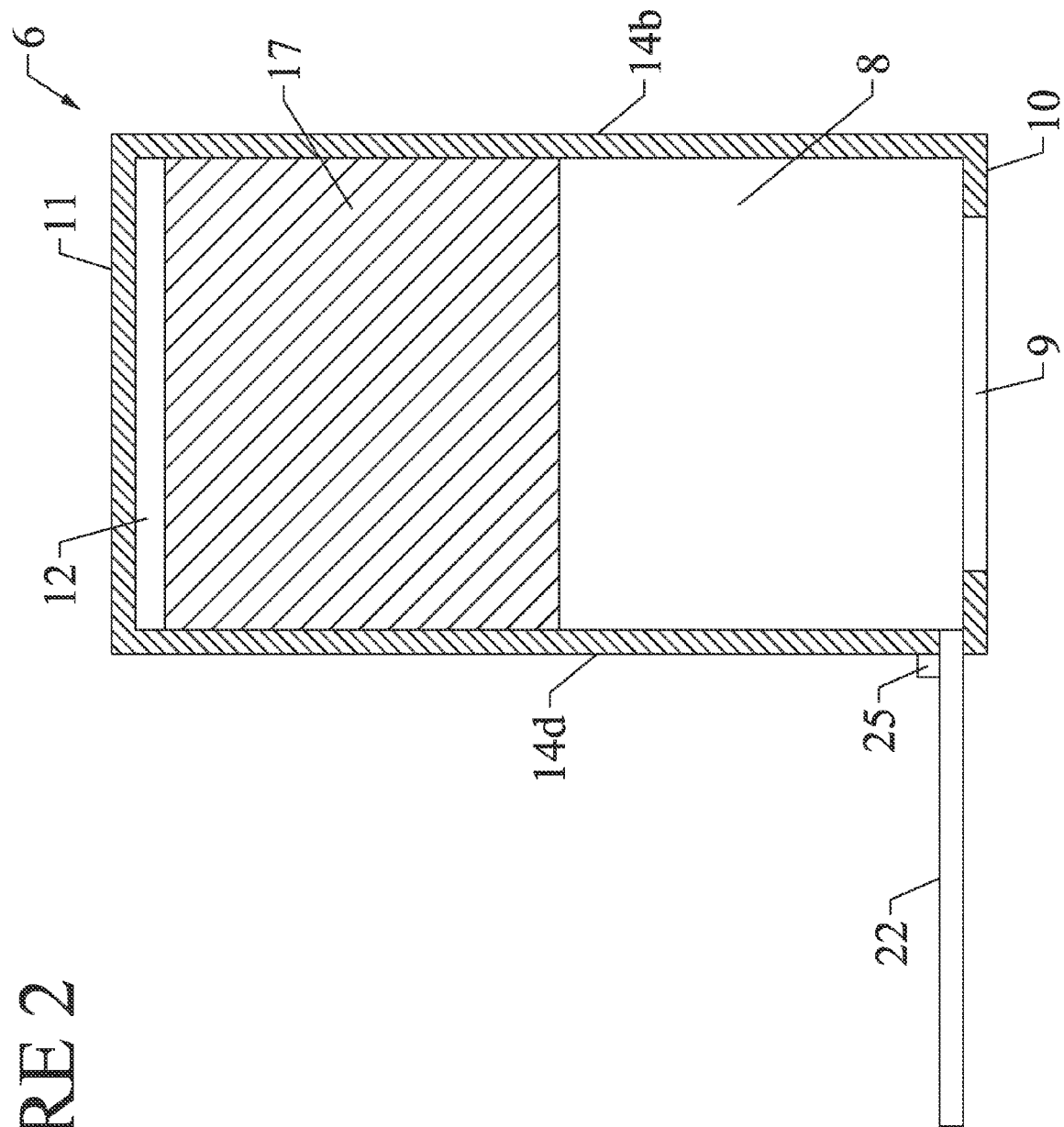
FIG. 2 is a cut view of the dual magnetic interlocking pin system.

FIG. 2 shows a cut view of the dual magnetic interlocking pin system. The cut view shows the dual magnetic interlocking pin system cut through two of the side walls (14b and 14d). The cut view also shows the top wall (10) and bottom wall (11) opposite each other.

The magnetically attractable outer plate (22) can be secured to a side wall using a fastening means (25).

In an embodiment, the fastening means can extend through the magnetically attractable outer plate and into the side wall. The fastening means can be an adhesive, a fastener, such as a screw or pin, an epoxy, other bonding materials, or combinations thereof.

An item can be a lighter, a flashlight, a keychain, a writing utensil, a lip care product, a cosmetic product, a medicine bottle, a memory card, a MP3 player, a portable media player, such as an IPOD™, a cell phone, a wallet, a cigarette case, eyeglass cases, eyeglasses, sunglasses, a horse bridal, a wake board, ski boots, or items of the like.

The magnetically attractable inner plate (12) can be attached to the bottom wall (11) inside the chamber (8).

The free moving magnet (17) is shown slidably disposed in the chamber (8) for moving between top wall (10) and the magnetically attractable inner plate (12).

A portion of the opening (9) is also shown in the top wall (10).

FIG. 3A shows a cut view of the dual magnetic interlocking pin system. The cut view shows the dual magnetic interlocking pin system cut through two of the side walls (14b and 14d). The cut view also shows the top wall (10) and bottom wall (11) opposite each other.

The magnetically attractable inner plate (12) is shown attached to the bottom wall (11) inside the chamber (8).

The free moving magnet (17) is shown slidably disposed in the chamber (8) in a first position (50) adjacent to the top wall (10). The free moving magnet (17) can be held in the first position (50) by the free moving magnet's magnetic attraction to the magnetically attractable outer plate (22).

FIG. 3A also shows a magnetic field (21), with a first magnetic field size (70), in a position that is attracted to the magnetically attractable outer plate (22).

An engagement pin (30) with a pin head (32) and a pin stem (34) is shown in a position outside the magnetic field produced by the free moving magnet (17). The engagement pin's (30) pin stem (34) has a diameter small enough to slidably move inside the chamber through the opening (9) in the top wall (10), and removable from the chamber. The pin stem comprises a magnetically attractable material capable of moving the free moving magnet (17).

In an embodiment, the pin stem can be cylindrical, conical, or polygonal with at least one pin stem flat face for engaging the first magnet flat side.

In an embodiment the pin stem and the pin head can be a two piece unit that can be made of a ferromagnetic material, such as steel, which can further be removably attachable to each other by threading, epoxy, bonding, welding, clamping, snapping, bolting, or other fastening means. In an additional embodiment the pin stem and the pin head can be a one piece unit that can be made of a ferromagnetic material. Additional magnetic materials can be used, such as iron and steel.

FIG. 3B shows a cut view of the dual magnetic interlocking pin system. The cut view shows the dual magnetic interlocking pin system cut through two of the side walls (14b and 14d). The cut view also shows the top wall (10) and bottom wall (11) opposite each other.

The magnetically attractable inner plate (12) is shown attached to the bottom wall (11) inside the chamber (8).

The engagement pin (30) with a pin head (32) and a pin stem (34) is shown in a magnetically attached position with the free moving magnet (17). Once the engagement pin (30) is in a magnetically attached position with the free moving magnet (17), the magnetic field (21) can change shape to a second magnetic field size (72).

The new shape of the magnetic field (21) changes the strength of the free moving magnet's magnetic attraction to the magnetically attractable inner plate (12), and the free moving magnet (17) moves to a second position (52) adjacent to the magnetically attractable inner plate (12) which can best be seen in FIG. 1C.

FIG. 3C shows a cut view of the dual magnetic interlocking pin system. The cut view shows the dual magnetic interlocking pin system cut through two of the side walls (14b and 14d). The cut view also shows the top wall (10) and bottom wall (11) opposite each other.

The magnetically attractable inner plate (12) is shown attached to the bottom wall (11) inside the chamber (8).

The engagement pin's pin stem (34) is shown slidably disposed in the chamber (8), through opening (9) in the top wall (10), in a magnetically attracted position attached to the free moving magnet (17).

The pin head can have a diameter larger then the pin stem and can be made from the same material as the pin stem. In another embodiment, the pin stem and the pin head can be made from different materials. Such materials can include but are not limited to plastics, metals, metal alloys, polymers, and wood for example.

The free moving magnet (17) is shown slidably disposed in the chamber (8) in a second position (52) adjacent to the magnetically attractable inner plate (12). The free moving magnet (17) is held in the second position (52) by the free moving magnet's magnetic attraction to the magnetically attractable inner plate (12).

FIG. 3D shows a cut view of the dual magnetic interlocking pin system. The cut view shows the dual magnetic interlocking pin system cut through two of the side walls (14b and 14d). The cut view also shows the top wall (10) and bottom wall (11) opposite each other.

The magnetically attractable inner plate (12) is shown attached to the bottom wall (11) inside the chamber (8).

When a force (60) pulls the engagement pin (30) with enough force to break the magnetic attraction between the free moving magnet (17) and the magnetically attractable inner plate (12), the free moving magnet (17) can then slide through the chamber until it makes contact with the top wall (10).

If the force (60) is still strong enough to break the magnetic attraction between the free moving magnet (17) and the engagement pin (30), then the engagement pin's (30) pin stem (34) can exit the chamber (8) through the opening (9) in the top wall (10).

Once the engagement pin (30) has been removed from the magnetically attracted position attached to the free moving magnet (17) the magnetic field (21) changes shape back to its first magnetic field size (70), and the free moving magnet (17) can once again be held in the first position (50) by the free moving magnets (17) magnetic attraction to the magnetically attractable outer plate (22).

While these embodiments have been described with emphasis on the embodiments, it should be understood that within the scope of the appended claims, the embodiments might be practiced other than as specifically described herein.

What is claimed is:

1. A dual magnetic interlocking pin system for attaching an item comprising:
   a. a chamber having an opening, at least a bottom wall, a side wall having a side wall top and wherein the side wall is connected to the bottom wall opposite the side wall top;
   b. a magnetically attractable inner plate fixed within the chamber adjacent the bottom wall;
   c. a free moving magnet with a first magnet flat side and a second magnet flat side opposite the first magnet flat side, wherein the free moving magnet is disposed in the chamber for moving between the opening and the magnetically attractable inner plate, wherein the free moving magnet is not removable from the chamber, and wherein the free moving magnet provides a magnetic field with a first field size;
   d. a first outer plate secured to the side wall top having a thickness and magnetic attraction strong enough to movably hold the free moving magnet adjacent the first outer plate; and
   e. an engagement pin comprising:
      (i) a pin head;
      (ii) a pin stem connected to the pin head, and wherein the pin stem has a diameter small enough to slidably move inside the chamber and the pin stem comprises a magnetically attractable material capable of moving the free moving magnet from a position adjacent the magnetically attractable inner plate to a position adjacent the first outer plate, wherein the pin stem moves relative to the opening, and wherein the pin stem is selectively removable from the chamber; and
      (iii) wherein when the pin stem is inside the chamber the free moving magnet moves to engage the magnetically attractable inner plate.

2. The dual magnetic interlocking pin system of claim 1, wherein the item is a lighter, a flashlight, a keychain, a writing utensil, a lip care product, a cosmetic product, a medicine bottle, a memory card, a MP3 player, a portable media, a cell phone, a wallet, a cigarette case, eyeglass cases, eyeglasses, sunglasses, horse bridals, wake boards, or ski boots.

3. The dual magnetic interlocking pin system of claim 1, wherein the first outer plate is secured to the side wall using a fastening means selected from a group: an adhesive, a fastener, an epoxy, other bonding materials, or combinations thereof.

4. The dual magnetic interlocking pin system of claim 3 wherein the first outer plate is removably secured to the side wall.

5. The dual magnetic interlocking pin system of claim 1, wherein the chamber is round or polygon.

6. The dual magnetic interlocking pin system of claim 1, wherein the pin stem is cylindrical, conical, or polygonal with at least one pin stem flat face for engaging the first magnet flat side.

7. The dual magnetic interlocking pin system of claim 1, wherein the chamber comprises a left side wall and a right side wall.

8. The dual magnetic interlocking pin system of claim 1, wherein the free moving magnet is a cylindrical-shaped magnet or a cube-shaped magnet.

9. The dual magnetic interlocking pin system of claim 8, wherein the free moving magnet is a solid magnet and all sides of the magnet are magnetic.

10. The dual magnetic interlocking pin system of claim 9, wherein the free moving magnet is a rare earth metal magnet.

11. The dual magnetic interlocking pin system of claim 1, wherein the pin stem and the pin head are a two piece unit.

12. The dual magnetic interlocking pin system of claim 11, wherein the pin head is removably attachable to the pin stem.

13. The dual magnetic interlocking pin system of claim 11, wherein the pin head and the pin stem are made of ferromagnetic material.

14. The a dual magnetic interlocking pin system of claim 11, wherein the pin head has a diameter larger than the pin stem.

* * * * *